(12) United States Patent
Nakamura et al.

(10) Patent No.: US 6,900,977 B2
(45) Date of Patent: May 31, 2005

(54) DIELECTRIC CERAMIC, MANUFACTURING METHOD THEREOF, AND MULTILAYER CERAMIC CAPACITOR

(75) Inventors: Tomoyuki Nakamura, Omihachiman (JP); Akira Kato, Omihachiman (JP); Kazuo Muto, Takatsuki (JP); Harunobu Sano, Kyoto (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 10/780,720

(22) Filed: Feb. 19, 2004

(65) Prior Publication Data

US 2004/0176239 A1 Sep. 9, 2004

(30) Foreign Application Priority Data

Mar. 3, 2003 (JP) .......................................... 2003-055359

(51) Int. Cl.[7] .................................................. H01G 4/06
(52) U.S. Cl. ................. 361/321.2; 361/311; 361/321.4; 29/25.41
(58) Field of Search ................. 361/311–313, 328–329; 29/25.41, 25.42; 501/137, 138, 139

(56) References Cited

U.S. PATENT DOCUMENTS

| | | | |
|---|---|---|---|
| 6,487,065 B1 | * | 11/2002 | Nishino et al. .......... 361/321.2 |
| 6,556,423 B2 | * | 4/2003 | Konaka et al. .......... 361/321.2 |
| 6,577,494 B2 | * | 6/2003 | Watanabe et al. ........ 361/321.2 |

FOREIGN PATENT DOCUMENTS

| | | |
|---|---|---|
| JP | 05-009066 | 1/1993 |
| JP | 06-005460 | 1/1994 |
| JP | 09-270366 | 10/1997 |
| JP | 10-074666 | 3/1998 |
| JP | 11-302071 | 11/1999 |
| JP | 2000-058377 | 2/2000 |
| JP | 2001-220224 | 8/2001 |
| JP | 2001-230149 | 8/2001 |

* cited by examiner

*Primary Examiner*—Anthony Dinks
(74) *Attorney, Agent, or Firm*—Dickstein, Shapiro, Morin & Oshinsky, LLP

(57) ABSTRACT

A dielectric ceramic formed by firing in a reducing atmosphere is provided. A multilayer ceramic capacitor formed by using the aforementioned dielectric ceramic has superior reliability even when the thicknesses of dielectric ceramic layers formed therefrom are reduced. The dielectric ceramic has crystal grains; and crystal boundaries and triple points, which are located between the crystal grains. The crystal grains contain perovskite compound grains composed of a perovskite compound represented by $ABO_3$ (where A is Ba and Ca, or Ba, Ca and Sr; B is Ti, or Ti and a part thereof which is replaced with at least one of Zr and Hf) and crystal oxide grains composed of a crystal oxide containing at least Ba, Ti and Si, and about 80% or more of the number of the triple points each have a cross-sectional area of about 8 $nm^2$ or less.

20 Claims, 3 Drawing Sheets

DIELECTRIC CERAMIC, MANUFACTURING METHOD THEREOF, AND MULTILAYER CERAMIC CAPACITOR

BACKGROUND OF THE INVENTION

1. Field of the Invention

The present invention relates to dielectric ceramics, manufacturing methods thereof, and multilayer ceramic capacitors formed by using the dielectric ceramics, and more particularly, relates to an improvement by which one is able to advantageously reduce the thickness of a dielectric ceramic layer forming a multilayer ceramic capacitor.

2. Description of the Related Art

A multilayer ceramic capacitor has been generally formed by the following steps.

First, ceramic green sheets containing a powdered starting material for a dielectric ceramic are prepared, each of which has on a surface thereof a conductive material having a desired pattern to be formed into an internal electrode. As the dielectric ceramic, for example, a material containing $BaTiO_3$ as a primary component may be used.

Next, a plurality of ceramic green sheets including the ceramic green sheets provided with the conductive material described above are laminated to each other and then processed by thermo-compression bonding, thereby forming an integrated green laminate.

This green laminate is then fired, and hence a fired laminate can be obtained. Inside the laminate thus obtained, internal electrodes composed of the aforementioned conductive material are provided.

Subsequently, external electrodes are formed on external surfaces of the laminate so as to be electrically connected to the respective internal electrodes. The external electrodes are formed, for example, by applying a conductive paste containing a powdered conductive metal and a glass frit on the external surfaces of the laminate, followed by firing.

As described above, the multilayer ceramic capacitor can be formed.

As a conductive material used for the internal electrodes described above, for example, a relatively inexpensive base metal such as nickel or copper has been increasingly used in recent years in order to reduce a manufacturing cost of a multilayer ceramic capacitor as low as possible. However, when a multilayer ceramic capacitor having internal electrodes composed of a base metal is formed, firing must be performed in a neutral or a reducing atmosphere in order to prevent the base metal from being oxidized, and hence a dielectric ceramic used for a multilayer ceramic capacitor must have reduction resistance.

As a dielectric ceramic which has reduction resistance as described above and which can form a multilayer ceramic capacitor having a capacitance-temperature characteristic which satisfies the B characteristic specified by the Japanese Industrial Standards (JIS), a ceramic has been used in practice which is composed, for example, of $BaTiO_3$ as a primary component; an oxide of a rare earth element; an oxide of manganese (Mn), iron (Fe), nickel (Ni), copper (Cu) or the like; and a firing auxiliary agent.

As the dielectric ceramic described above, a dielectric ceramic composition having a high dielectric constant and a long life under a high temperature load condition has been proposed, for example, in Japanese Unexamined Patent Application Publication Nos. 5-9066, 11-302071, and 2000-58377.

In addition, a dielectric ceramic having a so-called core-shell structure has been proposed in Japanese Unexamined Patent Application Publication Nos. 6-5460, 2001-220224, and 2001-230149 in view of the structure and texture of the dielectric ceramic.

In addition a dielectric ceramic having a high dielectric constant and superior insulating properties has been proposed which is obtained by controlling a grain boundary structure of the ceramic in Japanese Unexamined Patent Application Publication No. 9-270366.

In Japanese Unexamined Patent Application Publication No. 10-74666, a dielectric ceramic having superior reliability has been proposed which is obtained by controlling the size of segregation phases of the ceramic.

Concomitant with the recent advance of electronic technology, there has been an increasing trend toward miniaturization of electronic components in general, and miniaturization and larger capacitance of multilayer ceramic capacitors have also been actively pursued. As an effective method for realizing the miniaturization and larger capacity of multilayer ceramic capacitors, for example, a reduction in thickness of a dielectric ceramic layer may be mentioned. The thickness of a dielectric ceramic layer has been reduced to about 2 $\mu$m or less on a mass production level and to about 1 $\mu$m or less on an experimental level.

However, although the dielectric ceramic disclosed in Japanese Unexamined Patent Application Publication No. 5-9066 exhibits superior electrical insulating properties, when the thickness of the dielectric ceramic layer is reduced, for example, to 5 $\mu$m or less, and in particular, to 3 $\mu$m or less, the reliability of the dielectric ceramic cannot always sufficiently satisfy the requirements of the marketplace.

As is the case described above, as the thickness of the dielectric ceramic layer is reduced to 2 $\mu$m or less, the capacitance-temperature characteristic and the reliability of the dielectric ceramics disclosed in Japanese Unexamined Patent Application Publication Nos. 11-302071 and 2000-58377, are disadvantageously degraded.

In addition, the reliability is also disadvantageously decreased in the dielectric ceramic having a so-called core-shell structure disclosed in Japanese Unexamined Patent Application Publication Nos. 6-5460, 2001-220224, and 2001-230149, as the thickness of the dielectric ceramic layer is reduced. In the dielectric ceramic disclosed in Japanese Unexamined Patent Application Publication No. 9-270366, reaction between the primary component and the additive component is unstably carried out since an additive component added to a primary component such as $BaTiO_3$ is melted in a firing step, and as a result, in particular, when the thickness of the dielectric ceramic layer is reduced, a problem may occur in that the reliability cannot be stably ensured.

The dielectric ceramic disclosed in Japanese Unexamined Patent Application Publication No. 10-74666 also has a problem in that when the thickness of the dielectric ceramic layer is reduced, and in particular, is reduced to 3 $\mu$m or less, the reliability is decreased. In addition, since large amounts of volatile components such as lithium (Li) and boron (B) are present, a problem of the stability of electrical properties including the reliability occurs when the thickness of the dielectric ceramic layer is reduced.

When the thickness of the dielectric ceramic layer is reduced in order to meet the trend toward the miniaturization and the higher capacitance of a multilayer ceramic capacitor and the rated DC voltage is set as same as before, the applied electric field per layer of the dielectric ceramic layer is increased, and as a result, the reliability is significantly decreased.

Accordingly, a dielectric ceramic has been increasingly desired which can realize a reliable multilayer ceramic capacitor even when the thickness of a dielectric ceramic layer thereof is reduced.

SUMMARY OF THE INVENTION

Accordingly, an object of the present invention is to provide a dielectric ceramic which can satisfy the aforementioned desire, a manufacturing method of the dielectric ceramic, and a multilayer ceramic capacitor formed by using the dielectric ceramic described above.

Through intensive research carried out by the present inventors for solving the problems described above, it was found that control of the sizes of triple points and control of the states of components essentially present at the triple points are important.

In general, for example, as described in Japanese Unexamined Patent Application Publication No. 9-270366, the triple points are formed of an amorphous material in many cases and have a cross-sectional area of 10 nm$^2$ or more, in which excessive elements, such as silicon (Si) and an alkaline earth element such as barium (Ba), are present. It was found that the presence of the amorphous material in a sintered ABO$_3$ perovskite compound, which is different therefrom and has an area of 10 nm$^2$ or more, causes a decrease in reliability.

In addition, it was also found that when a compound containing Si, an alkaline earth element such as Ba, and the like, is present in the form of crystal grains, the reliability can be improved.

According to those findings just described above the present invention on a dielectric ceramic having the following features was made.

That is, a dielectric ceramic of the present invention comprises crystal grains; and crystal boundaries and triple points, which are located between the crystal grains, wherein the crystal grains contain perovskite compound grains composed of a perovskite compound represented by ABO$_3$ (where A is Ba and calcium (Ca), or Ba, Ca, and strontium (Sr); B is titanium (Ti), or Ti and a part thereof which is replaced with at least one of zirconium (Zr) and hafnium (Hf)) and crystal oxide grains composed of a crystal oxide containing at least Ba, Ti and Si, and about 80% or more of the number of the triple points each have a cross-sectional area of about 8 nm$^2$ or less.

In the present invention, the "crystal boundary" indicates an area formed by two crystal grains, and the "triple point" indicates an area formed by at least three crystal grains.

In the dielectric ceramic according to the present invention, the content of Ca of the perovskite compound grains is preferably in the range of from about 1 to 20 mole percent of the A element of the perovskite compound represented by ABO$_3$.

In addition, the dielectric ceramic of the present invention may further comprise an oxide containing R (where R is at least one selected from the group consisting of lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), lutetium (Lu) and yttrium (Y)), and M (where M is at least one selected from the group consisting of manganese (Mn), nickel (Ni), cobalt (Co), iron (Fe), chromium (Cr), copper (Cu), magnesium (Mg), aluminum (Al), vanadium (V), molybdenum (Mo) and tungsten (W)). In the case described above, the contents of R and M in the form of an element are preferably about 0.01 to 1.5 moles and about 0.1 to 2 moles, respectively, with respect to 100 moles of the ABO$_3$.

In addition, the present invention may also be applied to a method for manufacturing the dielectric ceramic described above.

That is, a method for manufacturing a dielectric ceramic according to the present invention comprises the steps of: forming a perovskite compound represented by ABO$_3$ (where A is Ba and Ca, or Ba, Ca, and Sr; B is Ti, or Ti and a part thereof which is replaced with at least one of Zr and Hf); forming a crystal oxide containing at least Ba, Ti and Si; forming a mixture comprising the perovskite compound and the crystal oxide; and firing the mixture.

In the method for manufacturing a dielectric ceramic described above, the mixture may further comprise an oxide containing R (where R is at least one selected from the group consisting of La, Ce, Pr, Nd, Sm, Eu, Gd, Tb, Dy, Ho, Er, Tm, Yb, Lu, and Y) and M (where M is at least one selected from the group consisting of Mn, Ni, Co, Fe, Cr, Cu, Mg, Al, V, Mo, and W).

In addition, the mixture may further comprise a firing auxiliary agent.

The present invention may also be applied to a multilayer ceramic capacitor formed by using a dielectric ceramic as described above.

A multilayer ceramic capacitor of the present invention comprises: a laminate containing a plurality of dielectric ceramic layers laminated to each other and a plurality of internal electrodes which are provided along specific interfaces between said plurality of dielectric ceramic layers and which are overlapped with each other in a lamination direction; and external electrodes provided on external surfaces of the laminate so as to be electrically connected to specific internal electrodes among said plurality of internal electrodes. The dielectric ceramic layers of the multilayer ceramic capacitor of the present invention are composed of the dielectric ceramic described above.

In the multilayer ceramic capacitor described above, when the internal electrodes comprise a base metal and/or when the external electrodes comprise a base metal, the present invention may be advantageously used.

DESCRIPTION OF THE PREFERRED EMBODIMENTS

Figure 1:
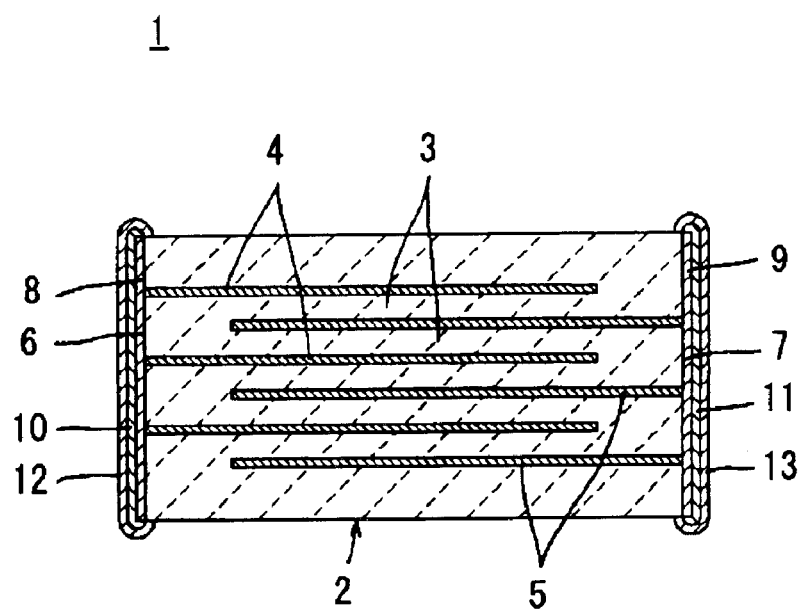
FIG. 1 is a schematic cross-sectional view of a multilayer ceramic capacitor of one embodiment according to the present invention.

FIG. 1 is a schematic cross-sectional view of a multilayer ceramic capacitor 1 of one embodiment according to the present invention.

The multilayer ceramic capacitor 1 comprises a laminate 2. The laminate 2 is formed of a plurality of dielectric ceramic layers 3 laminated to each other and a plurality of internal electrodes 4 and 5 provided along specific interfaces between the dielectric ceramic layers 3. The internal electrodes 4 and 5 are formed so as to be extended to external surfaces of the laminate 2, with the internal electrodes 4 extended to one end surface 6 of the laminate 2 and the internal electrodes 5 extended to the other end surface 7 alternately provided in the laminate 2.

Onto the end surfaces 6 and 7, which are the external surfaces of the laminate 2, a conductive paste is applied and is then fired, thereby forming external electrodes 8 and 9, respectively. In addition, on the external electrodes 8 and 9, whenever necessary, first plating layers 10 and 11 are formed, respectively, and on the surfaces thereof, respective second plating layers 12 and 13 are formed.

In the multilayer ceramic capacitor 1 described above the internal electrodes 4 and 5 are formed alternately to each other in a lamination direction of the laminate 2, thereby forming static capacitance between internal electrodes 4 and 5 which are adjacent to each other. In addition, the internal electrodes 4 and the external electrodes 8 are electrically connected to each other, and the internal electrodes 5 and the external electrodes 9 are electrically connected to each other. Hence, the aforementioned static capacitance can be obtained through those external electrodes 8 and 9.

The dielectric ceramic layers 3 are formed of the following dielectric ceramic according to the present invention.

That is, the dielectric ceramic layers 3 are formed of a dielectric ceramic comprising crystal grains, and crystal grain boundaries and triple points, which are located between the crystal grains. In the dielectric ceramic, the crystal grains are perovskite compound grains formed of a perovskite compound represented by $ABO_3$ (where A is Ba and Ca, or Ba, Ca, and Sr; and B is Ti, or Ti and a part thereof replaced with at least one of Zr and Hf) and crystal oxide grains formed of a crystal oxide containing at least Ba, Ti and Si, and among the triplet points, about 80% or more thereof in number have a cross-sectional area of about 8 $nm^2$ or less.

When the conditions described above are not satisfied, a problem in that superior reliability cannot be obtained occurs in a high temperature load life test or the like.

The content of Ca of the perovskite compound grains contained in the dielectric ceramic described above is preferably set in the range of from about 1 to 20 mole percent of the A element of the perovskite compound represented by $ABO_3$.

When the conditions described above are satisfied, the dielectric constant of the dielectric ceramic can be maintained at a high level.

In addition, the dielectric ceramic may further comprise an oxide containing R (where R is at least one selected from the group consisting of La, Ce, Pr, Nd, Sm, Eu, Gd, Tb, Dy, Ho, Er, Tm, Yb, Lu and Y) and M (where M is at least one selected from the group consisting of Mn, Ni, Co, Fe, Cr, Cu, Mg, Al, V, Mo and W), and the contents of R and M in the form of an element are preferably about 0.01 to 1.5 moles and about 0.1 to 2 moles, respectively, with respect to 100 moles of $ABO_3$.

When R and M are contained at the contents described above, the reliability can be further improved while a high dielectric constant is being maintained.

Next, a method for manufacturing a dielectric ceramic and the multilayer ceramic capacitor 1 shown in FIG. 1 will be described.

First, a powdered starting material for a dielectric ceramic forming the dielectric ceramic layers 3 is prepared. This powdered stating material is preferably formed as described below.

That is, desired A (A is Ba and Ca, or Ba, Ca, and Sr) and B (B is Ti, or Ti and a part thereof replaced with at least one of Zr and Hf) are selected, and at the same time, the contents thereof are desirably selected, thereby forming a perovskite compound represented by $ABO_3$.

In addition, a crystal oxide containing at least Ba, Ti and Si is formed. This oxide may contain an element such as an alkaline earth element or a transition metal element. In order to confirm whether this oxide has a crystal structure, for example, an X-ray diffraction method (XRD) may be used.

Next, the perovskite compound and the crystal oxide containing at least Ba, Ti and Si are mixed together, and whenever necessary, a compound such as the aforementioned oxide containing R (La or the like) and M (Mn or the like) and a firing auxiliary agent such as Si are mixed together. Accordingly, the mixture thus formed is used as the powdered starting material for the dielectric ceramic.

By using the powdered starting material thus formed, shaping and firing treatments are performed as described later, and as a result, a dielectric ceramic can be easily formed which comprises, as the crystal grains, perovskite compound grains formed of a perovskite compound represented by $ABO_3$ and crystal oxide grains formed of a crystal oxide containing at least Ba, Ti and Si. In the dielectric ceramic described above, about 80 percent or more thereof by number of the triple points have a cross-sectional area of about 8 $nm^2$ or less.

Without being limited to theory, it is believed that since excessive components, which are essentially liable to be gathered at the triple points, are absorbed in the crystal oxide containing at least Ba, Ti and Si in the firing step, and the size of the triple point becomes very small.

In addition to a process for forming the starting material as described above, a dielectric ceramic having the composition and the structure described above can be obtained for example, by adjustment of firing conditions.

Next, an organic binder and a solvent are added to the powdered dielectric ceramic, followed by mixing, thereby forming a slurry. Ceramic green sheets to be formed into the dielectric ceramic layers 3 are formed from this slurry.

Next, a conductive paste film to be formed into the internal electrode 4 or 5 is provided and organic binder and a solvent are added, for example, by screen printing. This conductive paste film contains a base metal such as nickel, a nickel alloy, copper or a copper alloy as a conductive component. In addition to a printing method such as screen printing, the internal electrodes 4 and 5 may be formed, for example, by deposition or plating.

Subsequently, the ceramic green sheets provided with the conductive paste films as described above are laminated to each other, and at the same time, ceramic green sheets which are not provided with the conductive paste films are laminated so as to sandwich the aforementioned ceramic green sheets. After being compressed for bonding, the ceramic green sheets are cut whenever necessary, thereby forming a green laminate to be formed into the laminate 2. In this green laminate, the end portions of the conductive paste films are each exposed at one of the end surfaces of the laminate 2.

The green laminate is then fired in a reducing atmosphere. By this step, the fired laminate 2 shown in FIG. 1 is obtained, and in the laminate 2, the ceramic green sheets and the conductive paste films described above form the dielectric ceramic layers 3 and the internal electrodes 4 and 5, respectively.

Next, the external electrodes 8 and 9 are formed on the end surfaces 6 and 7 of the laminate 2, respectively, so as to be electrically connected to respective exposed end portions of the internal electrodes 4 and 5.

As a material for the external electrodes 8 and 9, the same material as that for the internal electrodes 4 and 5 may be used, and in addition, silver, palladium, a silver-palladium alloy or the like, may also be used. Furthermore, a material which contains a powder of the metal described above and a glass frit composed of a $B_2O_3$—$SiO_2$—$BaO$ base glass or a $B_2O_3$—$Li_2O$—$SiO_2$—$BaO$ base glass, may also be used. In consideration of applications of the multilayer ceramic capacitor 1 and the places at which it is used, an appropriate material may be selected.

In addition, the external electrodes 8 and 9 are generally formed by applying a paste containing a powdered conductive metal as described above onto external surfaces of the fired laminate 2, followed by firing; however, by applying the paste onto external surfaces of a green laminate, followed by firing, the external electrodes may be simultaneously formed together with the laminate 2.

Subsequently, nickel, copper, or the like is plated on the external electrodes 8 and 9 thereby forming first plating layers 10 and 11, respectively. Next, on the first plating layers 10 and 11, solder, tin or the like, is plated, thereby forming second plating layers 12 and 13, respectively. The plating layers 10 to 13 on the external electrodes 8 and 9 may not be formed in some cases depending on the intended applications of the multilayer ceramic capacitor 1.

As described above, the multilayer ceramic capacitor 1 is completed.

In some steps of forming the powdered starting material for the dielectric ceramic and/or of manufacturing the multilayer ceramic capacitor 1, contamination caused by impurities such as sodium (Na) may occur in some cases; however, the contamination will not cause problems in view of electrical properties of the multilayer ceramic capacitor 1.

In addition, nickel or copper is preferably used as a material for the internal electrodes 4 and 5. In the firing step for forming the multilayer ceramic capacitor 1, components contained in the internal electrodes 4 and 5 may be present due to diffusion in the crystal grains or in the crystal grain boundaries of the dielectric ceramic which forms the dielectric ceramic layers 3. However, the presence of the components described above will not cause problems in view of electrical properties of the multilayer ceramic capacitor 1.

Next, in order to confirm the effect of the present invention, examples were performed as described below.

EXPERIMENTAL EXAMPLES

Experimental Example 1

In experimental example 1, as shown in Table 1, $ABO_3$ was used as a primary component which contained Ba, Ca and Ti and which had a $(Ba_{0.93}Ca_{0.07})TiO_3$ composition, and a mixture of $BaCO_3$, $TiO_2$ and $SiO_2$, or a Ba—Ti—Si—O crystal oxide was used as an additive component. By using these components, examples 1-1 and 1-2 according to the present invention and comparative examples 1-1 and 1-2 outside the present invention were carried out for evaluation.

1. Formation of Powdered Starting Material for Dielectric Ceramic (1) Example 1-1

First, as starting materials for the primary component, $BaCO_3$, $CaCO_3$, and $TiO_2$ were weighed in amounts so as to form a $(Ba_{0.93}Ca_{0.07})TiO_3$ composition and were then mixed together using a ball mill, followed by heat treatment at 1,050° C., thereby forming $(Ba_{0.93}Ca_{0.07})TiO_3$. The average grain diameter was 0.3 $\mu$m.

In order to obtain the additive component, $BaCO_3$, $TiO_2$ and $SiO_2$ were weighed in amounts so as to have a molar ratio of 9:1:10 and were then mixed together using a ball mill, followed by heat treatment at 1,000° C., thereby forming a Ba—Ti—Si—O crystal oxide. The crystallinity of this oxide was confirmed using XRD. In addition, the average grain diameter was 0.15 $\mu$m.

Next, the $(Ba_{0.93}Ca_{0.07})TiO_3$ and the Ba—Ti—Si—O crystal oxide were weighed in amounts so as to have a weight ratio of 98:2 as shown in Table 1 and were then mixed together using a ball mill, thereby forming a powdered starting material for a dielectric ceramic according to example 1-1.

(2) Example 1-2

In accordance with the same manner as that in example 1-1 described above, after the $(Ba_{0.93}Ca_{0.07})TiO_3$ and a Ba—Ti—Si—O crystal oxide were obtained, the $(Ba_{0.93}Ca_{0.07})TiO_3$ and the Ba—Ti—Si—O crystal oxide were weighed in amounts so as to have a weight ratio of 95:5 as shown in Table 1 and were then mixed together using a ball mill, thereby forming a powdered starting material for a dielectric ceramic according to example 1-2.

(3) Comparative Example 1-1

Comparative example 1-1 compares to example 1-1.

In accordance with the same manner as that in example 1-1 described above, $(Ba_{0.93}Ca_{0.07})TiO_3$ was obtained.

Next, $BaCO_3$, $TiO_2$, and $SiO_2$ were weighed in amounts so as to have the same composition as that of the Ba—Ti—Si—O crystal oxide in example 1-1. Subsequently, the $(Ba_{0.93}Ca_{0.07})TiO_3$ and the mixture of $BaCO_3$, $TiO_2$ and $SiO_2$ were weighed in amounts so as to have a weight ratio of 98:2 as shown in Table 1 and were then mixed together using a ball mill, thereby forming a powdered starting material for a dielectric ceramic according to comparative example 1-1.

(4) Comparative Example 1-2

Comparative example 1-2 compares to example 1-2.

In accordance with the same manner as that in example 1-2 described above, $(Ba_{0.93}Ca_{0.07})TiO_3$ was obtained.

Next, as was the case of comparative example 1-1, $BaCO_3$, $TiO_2$, and $SiO_2$ were prepared. Subsequently, the $(Ba_{0.93}Ca_{0.07})TiO_3$ and the mixture of $BaCO_3$, $TiO_2$, and $SiO_2$ were weighed so as to realize a weight ratio of 95:5 as shown in Table 1 and were then mixed together using a ball mill, thereby forming a powdered starting material for a dielectric ceramic according to comparative example 1-2.

TABLE 1

| | Primary Component | | Additive Component | |
|---|---|---|---|---|
| | Composition | Weight Ratio (Weight Percent) | Composition | Weight Ratio (Weight Percent) |
| Example 1-1 | $(Ba_{0.93}Ca_{0.07})TiO_3$ | 98 | Ba—Ti—Si—O crystal oxide | 2 |
| Example 1-2 | $(Ba_{0.93}Ca_{0.07})TiO_3$ | 95 | Ba—Ti—Si—O crystal oxide | 5 |
| Comparative Example 1-1 | $(Ba_{0.93}Ca_{0.07})TiO_3$ | 98 | Mixture of $BaCO_3$, $TiO_2$ and $SiO_2$ | 2 |
| Comparative Example 1-2 | $(Ba_{0.93}Ca_{0.07})TiO_3$ | 95 | Mixture of $BaCO_3$, $TiO_2$ and $SiO_2$ | 5 |

2. Formation of Multilayer Ceramic Capacitor

Next, a polyvinyl butyral base binder and an organic solvent such as ethanol were added to each of the powdered starting materials for the dielectric ceramics of examples 1-1 and 1-2 and comparative examples 1-1 and 1-2, followed by wet mixing using a ball mill, thereby forming a ceramic slurry.

The ceramic slurry thus obtained was formed into sheets by a doctor blade method so that the thickness of a dielectric ceramic layer obtained therefrom after firing was 1.5 μm, thereby forming rectangular ceramic green sheets.

Next, a conductive paste primarily composed of nickel was applied onto the ceramic green sheets by screen printing, thereby forming conductive paste films to be formed into the internal electrodes.

Next, a plurality of ceramic green sheets including the ceramic green sheets provided with the conductive paste films was laminated to each other so that the end portions of the ceramic green sheets at which the conductive paste films were present were alternately disposed in directions opposite to each other, thereby forming a green laminate.

Next, after being heated to 300° C. in a nitrogen atmosphere to remove the binder, the green laminate thus formed was fired for 2 hours at 1,200° C. and at an oxygen partial pressure of $10^{-10}$ MPa in a reducing atmosphere composed of a $H_2$—$N_2$—$H_2O$ gas, thereby forming a fired laminate.

Subsequently, a conductive paste containing copper as a conductive component in addition to a $B_2O_3$—$Li_2O$—$SiO_2$—$BaO$ base glass frit was applied onto two end surfaces of the laminate, followed by firing at 800° C. in a nitrogen atmosphere, thereby forming external electrodes electrically connected to the internal electrodes.

The external dimensions of the multilayer ceramic capacitor thus formed had a width of 1.2 mm, a length of 2.0 mm and a thickness of 1.0 mm, and the thickness of the dielectric ceramic layers interposed between the internal electrodes was 1.5 μm. The number of effective dielectric ceramic layers was 100, and the counter electrode area per layer was 1.4 $mm^2$.

3. Structure of Dielectric Ceramic and Composition Analysis

For the individual multilayer ceramic capacitors obtained in examples 1-1 and 1-2 and comparative examples 1-1 and 1-2, composition analysis of an optional crystal grain present on a cross-section of the dielectric ceramic forming the dielectric ceramic layer was performed using TEM-EDX.

According to the results thus obtained, when the crystal grain was not a perovskite compound grain formed of a perovskite compound represented by $ABO_3$ and was a grain formed of an oxide containing at least Ba, Ti and Si, the grain was confirmed by electron diffraction of TEM whether it had a crystal structure. Subsequently, by TEM observation, image analysis processing was performed for optional 20 triple points, and individual cross-sectional areas were obtained.

The analytical results of the structures of the dielectric ceramics and the composition analyses thereof thus obtained are shown in Table 2.

TABLE 2

| | Crystal Grains | | Triple Points 8 $nm^2$ or less in Area (%) |
|---|---|---|---|
| Example 1-1 | $(Ba_{0.93}Ca_{0.07})TiO_3$ | Ba—Ti—Si—O Crystal Oxide | 90 |
| Example 1-2 | $(Ba_{0.93}Ca_{0.07})TiO_3$ | Ba—Ti—Si—O Crystal Oxide | 90 |
| Comparative Example 1-1 | $(Ba_{0.93}Ca_{0.07})TiO_3$ | — | 70 |
| Comparative Example 1-2 | $(Ba_{0.93}Ca_{0.07})TiO_3$ | — | 35 |

In Table 2, a "Ba—Ti—Si—O Crystal Oxide" shown in the column of "Crystal Grains" indicates that crystal oxide grains composed of a Ba—Ti—Si—O crystal oxide are present. In addition, in Table 2, in the column of "Triple Points 8 $nm^2$ or less in Area (%)" indicates the percent of the number of triple points having a cross-sectional area of about 8 nm or less.

According to the analytical results by the TEM-EDX described above, it was found that crystal grains composed of $(Ba_{0.93}Ca_{0.07})TiO_3$ and crystal grains composed of a Ba—Ti—Si—O crystal oxide were present in the dielectric ceramics of examples 1-1 and 1-2, the junctions between the crystal grains were very preferably formed at the triple points, and a "pool" made of an excessive component was not observed.

Figure 2:
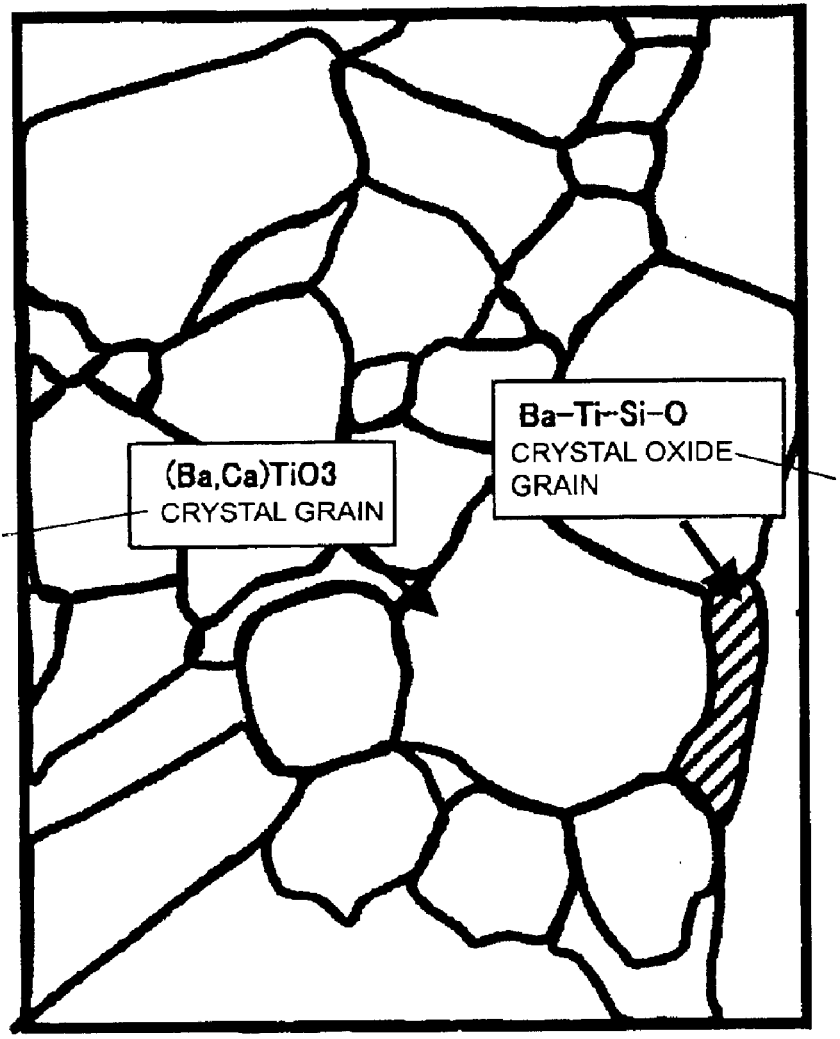
FIG. 2 is a schematic view showing crystal grains composed of $(Ba_{0.93}Ca_{0.07})TiO_3$ and crystal grains composed of a Ba—Ti—Si—O crystal oxide, according to one example of the present invention, the schematic view drawn by tracing a TEM bright field image.

FIG. 2 is a schematic view drawn by tracing a TEM bright field image of grains of example 1-1. As shown in FIG. 2, it was found that crystal grains 21 composed of $(Ba_{0.93}Ca_{0.07})TiO_3$ and crystal grains 22 composed of a Ba—Ti—Si—O crystal oxide were present. In addition, although not shown in the figure, the same result as that just described was obtained for the dielectric ceramic of example 1-2.

Figure 3:
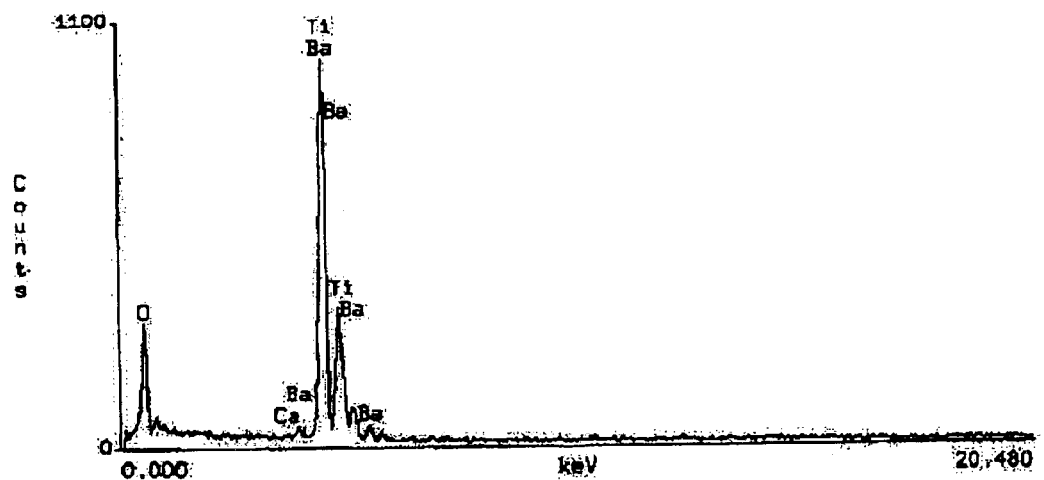
FIG. 3 is a graph showing a composition analytical result of crystal grains composed of the $(Ba_{0.93}Ca_{0.07})TiO_3$ shown in FIG. 2 obtained by TEM-EDX.
Figure 4:
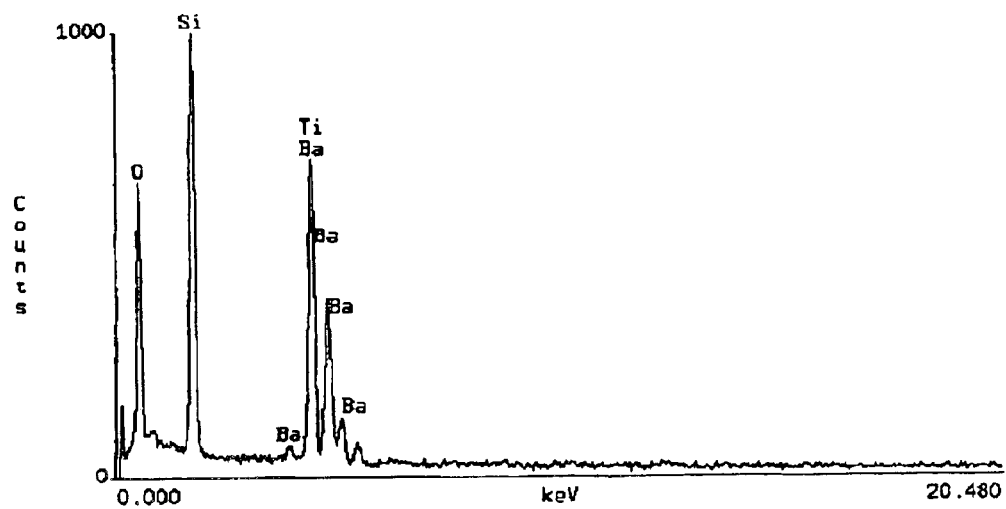
FIG. 4 is a graph showing a composition analytical result of crystal grains composed of the Ba—Ti—Si—O crystal oxide shown in FIG. 2 obtained by TEM-EDX.

The analytical result of the crystal grains composed of $(Ba_{0.93}Ca_{0.07})TiO_3$ of example 1-1 by TEM-EDX is shown in FIG. 3, and the analytical result of the crystal grains composed of a Ba—Ti—Si—O crystal oxide by TEM-EDX is shown in FIG. 4. In addition, although not shown in the figure, the same results as those just described above were obtained for the dielectric ceramic of example 1-2.

On the other hand, as shown in Table 2, in the dielectric ceramics of comparative examples 1-1 and 1-2, a Ba—Ti—Si—O crystal oxide was not observed, and as the crystal grains, crystal grains composed of $(Ba_{0.93}Ca_{0.07})TiO_3$ were only present.

4. Measurement of Electrical Properties

Various electrical properties of the multilayer ceramic capacitors obtained in examples 1-1 and 1-2 and comparative examples 1-1 and 1-2 were measured.

First, the dielectric constant of the dielectric ceramic forming the dielectric ceramic layer of each multilayer ceramic capacitor was measure at a temperature of 25° C., a frequency of 1 kHz and a voltage of 0.5 $V_{rms}$.

In addition, the rate of change in static capacitance with respect to the change in temperature was obtained. As for this rate of change in static capacitance with respect to the change in temperature, the rate of change at −25° C. and that at 85° C. based on static capacitance at 20° C., which is in accordance with the B characteristic specified by JIS, and the rate of change at −55° C. and that at 125° C. based on static capacitance at 25° C., which is in accordance with the X7R characteristic specified by the EIA standards, were used for evaluation.

Also, the insulating resistance was measured at 25° C. after a DC voltage of 6.3 V was applied for 60 seconds, and from the result thus obtained, a capacitance times resistance (CR) product was obtained.

Furthermore, a high temperature load life test was performed. In the high temperature load life test, the insulating resistance with time was measured at 125° C. while a voltage of 15 V was applied so as to obtain an electric field strength of 10 kV/mm. If the insulating resistance of a sample became 200 kΩ or less within 1,000 hours after the start of evaluation, the sample was regarded as a defective, and the rate (defective rate) of the number of defectives among 100 samples was obtained.

The dielectric constants, the capacitance-temperature characteristics, the CR products, and the defective rates of the high temperature load life test are shown in Table 3.

about 8 nm² or less was 90%. As shown in Table 3, no defectives were observed in the high temperature load life test of examples 1-1 and 1-2.

On the other hand, in comparative examples 1-1 and 1-2, the crystal grains composed of $(Ba_{0.93}Ca_{0.07})TiO_3$ were only present, the crystal grains composed of the Ba—Ti—Si—O crystal oxide were not present, and the percent of the number of triple points having a cross-sectional area of about 8 nm² or less were 70% and 35%, respectively. Most of the other triple points had a large area such as 10 nm² or more and were amorphous. In addition, the components of those triple points contained Ba, Ti and Si. As shown in Table 3, the reliability was very low in the high temperature load life test of comparative examples 1-1 and 1-2.

Experimental Example 2

In experimental example 2, a preferable range of the content of Ca of perovskite compound grains composed of a perovskite compound represented by $ABO_3$ was evaluated. First, as starting materials for a primary component, $BaCO_3$, $CaCO_3$, $SrCO_3$, $TiO_2$ and $HfO_2$ were weighed so as to realize compositions shown in the column of "Composition of Primary Component" in Table 4 and were then mixed together using a ball mill, followed by heat treatment at 1,160° C., thereby obtaining primary components having various compositions in which the content of Ca of the A site was from 0 to 22 mole percent. The average grain diameter was 0.3 μm.

TABLE 4

| | Composition of Primary Component |
|---|---|
| Example 2-1 | $(Ba_{0.985}Sr_{0.005}Ca_{0.01})(Ti_{0.99}Hf_{0.01})O_3$ |
| Example 2-2 | $(Ba_{0.945}Sr_{0.005}Ca_{0.05})(Ti_{0.99}Hf_{0.01})O_3$ |
| Example 2-3 | $(Ba_{0.895}Sr_{0.005}Ca_{0.10})(Ti_{0.99}Hf_{0.01})O_3$ |
| Example 2-4 | $(Ba_{0.845}Sr_{0.005}Ca_{0.15})(Ti_{0.99}Hf_{0.01})O_3$ |
| Example 2-5 | $(Ba_{0.795}Sr_{0.005}Ca_{0.20})(Ti_{0.99}Hf_{0.01})O_3$ |
| Example 2-6 | $(Ba_{0.775}Sr_{0.005}Ca_{0.22})(Ti_{0.99}Hf_{0.01})O_3$ |
| Comparative Example 2 | $(Ba_{0.995}Sr_{0.005})(Ti_{0.99}Hf_{0.01})O_3$ |

In addition, $BaCO_3$, $TiO_2$, NiO and $SiO_2$ were weighed so as to realize a molar ratio of 8.5:1:0.5:10 and were then mixed together using a ball mill, followed by heat treatment at 950° C., thereby forming a Ba—Ti—Ni—Si—O crystal oxide. The crystallinity of this oxide was confirmed using XRD. In addition, the average grain diameter was 0.15 μm.

TABLE 3

| | Dielectric Constant | Capacitance-Temperature Characteristic | | | | CR Product (ΩF) | Defective Rate |
|---|---|---|---|---|---|---|---|
| | | 20° C. Basis | | 25° C. Basis | | | |
| | | −25° C. | 85° C. | −55° C. | 125° C. | | |
| Example 1-1 | 3,900 | −1.4 | −8.6 | −5 | −13.4 | 3,450 | 0/100 |
| Example 1-2 | 2,800 | −1.2 | −8.1 | −3.4 | −12.9 | 3,200 | 0/100 |
| Comparative Example 1-1 | 4,300 | −2.3 | −8.1 | −6.3 | −14.3 | 3,500 | 41/100 |
| Comparative Example 1-2 | 4,100 | −1.8 | −7.3 | −5.4 | −12.8 | 3,450 | 58/100 |

5. Evaluation

As shown in Table 2, as the crystal grains, the crystal grains composed of $(Ba_{0.93}Ca_{0.07})TiO_3$, and the crystal grains composed of the Ba—Ti—Si—O crystal oxide were present in examples 1-1 and 1-2, and the percent of the number of triple points having a cross-sectional area of Next, two moles of $SiO_2$ used as a firing auxiliary agent was added to 100 moles of the primary component thus obtained, and at the same time, the Ba—Ti—Ni—Si—O crystal oxide obtained described above was also added thereto so that the weight ratio of the total of the primary component and the firing auxiliary agent to the Ba—Ti—Ni—Si—O crystal oxide was 99.9 to 0.1. Subsequently, the mixture thus obtained was mixed using a ball mill, thereby forming powdered starting materials for dielectric ceramics according to examples 2-1 to 2-6 and comparative example 2.

Next, in a manner similar to that in experimental example 1 but using the powdered starting materials for the dielectric ceramics according to examples 2-1 to 2-6 and comparative example 2, multilayer ceramic capacitors were formed, and in addition to the analyses of the structures and the compositions of the dielectric ceramics forming the dielectric ceramic layers of the multilayer ceramic capacitors, various electrical properties were also measured.

The analytical results of the structures and the compositions of the dielectric ceramics and the measurement results of the electrical properties are shown in Tables 5 and 6, respectively.

example 2-6 (Table 4), the dielectric constant was slightly decreased (Table 6). From these results it was understood that the content of Ca was preferably in the range of from about 1 to 20 mole percent. On the other hand, since Ca was not contained in the primary starting material represented by $ABO_3$ of comparative example 2, (Table 4), the reliability was inferior in the high temperature load life test, and in addition, the dielectric constant was also decreased, as shown in Table 6.

Experimental Example 3

In experimental example 3, addition of an oxide containing R (where R is at least one selected from the group consisting of La, Ce, Pr, Nd, Sm, Eu, Gd, Tb, Dy, Ho, Er, Tm, Yb, Lu and Y) and M (where M is at least one selected from the group consisting of Mn, Ni, Co, Fe, Cr, Cu, Mg, Al, V, Mo and W) was evaluated.

TABLE 5

|  | Crystal Grains | | Triple Points 8 nm² or less in Area (%) |
|---|---|---|---|
| Example 2-1 | $(Ba_{0.985}Sr_{0.005}Ca_{0.01})(Ti_{0.99}Hf_{0.01})O_3$ | Ba—Ti—Ni—Si—O Crystal Oxide | 90 |
| Example 2-2 | $(Ba_{0.945}Sr_{0.005}Ca_{0.05})(Ti_{0.99}Hf_{0.01})O_3$ | Ba—Ti—Ni—Si—O Crystal Oxide | 90 |
| Example 2-3 | $(Ba_{0.895}Sr_{0.005}Ca_{0.10})(Ti_{0.99}Hf_{0.01})O_3$ | Ba—Ti—Ni—Si—O Crystal Oxide | 95 |
| Example 2-4 | $(Ba_{0.845}Sr_{0.005}Ca_{0.15})(Ti_{0.99}Hf_{0.01})O_3$ | Ba—Ti—Ni—Si—O Crystal Oxide | 90 |
| Example 2-5 | $(Ba_{0.795}Sr_{0.005}Ca_{0.20})(Ti_{0.99}Hf_{0.01})O_3$ | Ba—Ti—Ni—Si—O Crystal Oxide | 90 |
| Example 2-6 | $(Ba_{0.775}Sr_{0.005}Ca_{0.22})(Ti_{0.99}Hf_{0.01})O_3$ | Ba—Ti—Ni—Si—O Crystal Oxide | 85 |
| Comparative Example 2 | $(Ba_{0.995}Sr_{0.005})(Ti_{0.99}Hf_{0.01})O_3$ | Ba—Ti—Ni—Si—O Crystal Oxide | 90 |

TABLE 6

|  | Dielectric Constant | Capacitance-Temperature Characteristic (%) | | | | CR Product ($\Omega$F) | Defective Rate |
|---|---|---|---|---|---|---|---|
|  |  | 20° C. Basis | | 25° C. Basis | | | |
|  |  | −25° C. | 85° C. | −55° C. | 125° C. | | |
| Example 2-1 | 3,800 | −1.3 | −5.3 | −3.6 | −12.5 | 3,100 | 0/100 |
| Example 2-2 | 3,700 | −0.8 | −5.3 | −2.9 | −12.3 | 3,100 | 0/100 |
| Example 2-3 | 3,600 | −0.1 | −4.8 | −3.3 | −11.9 | 3,050 | 0/100 |
| Example 2-4 | 3,400 | 0.2 | −5.1 | −1.8 | −12.2 | 3,000 | 0/100 |
| Example 2-5 | 3,100 | 0.1 | −4.9 | −2.1 | −11.8 | 2,950 | 0/100 |
| Example 2-6 | 2,700 | −0.1 | −5.2 | −1.9 | −12.3 | 2,800 | 0/100 |
| Comparative Example 2 | 2,300 | −4.0 | −6.5 | −8.3 | −14.2 | 2,450 | 13/100 |

First, as shown in Table 5, perovskite compound grains composed of a perovskite compound represented by $ABO_3$ and crystal oxide grains composed of a Ba—Ti—Ni—Si—O crystal oxide were present. In addition, the percent of the number of triple points having a cross-sectional area of about 8 nm² or less was about 80% or more.

In examples 2-1 to 2-6, as shown in Table 4, the content of Ca of the A site of the primary starting material represented by $ABO_3$ was changed from 1 to 22 mole percent. As shown in Table 6, no defectives were observed in the high temperature load life test of examples 2-1 to 2-6. However, since the content of Ca in the primary starting material represented by $ABO_3$ was large such as 22 mole percent in First, as starting materials for a primary component, $BaCO_3$, $CaCO_3$, $TiO_2$, and $ZrO_2$ were weighed so as to realize a composition of $(Ba_{0.98}Ca_{0.02})(Ti_{0.995}Zr_{0.005})O_3$ and were then mixed together using a ball mill, followed by heat treatment at 1,150° C., thereby obtaining $(Ba_{0.98}Ca_{0.02})(Ti_{0.995}Zr_{0.005})O_3$. The average grain diameter was 0.25 μm.

In addition, $BaCO_3$, $SrCO_3$, $TiO_2$, $MnO_2$, MgO and $SiO_2$ were weighed so as to realize a molar ratio of 8.0:1.0:0.5:0.5:0.5:10 and were then mixed together using a ball mill, followed by heat treatment at 900° C., thereby forming a Ba—Sr—Ti—Mn—Mg—Si—O crystal oxide. The crystallinity of this oxide was confirmed using XRD. In addition, the average grain diameter was 0.1 μm.

Next, various R and various M as the additive components shown in Table 7 were added to 100 moles of the $(Ba_{0.98}Ca_{0.02})(Ti_{0.995}Zr_{0.005})O_3$ in accordance with the molar ratios shown in the column of "Composition Ratio" in this table, and at the same time, two moles of $SiO_2$ used as a firing auxiliary agent was also added. In addition, the Ba—Sr—Ti—Mn—Mg—Si—O crystal oxide obtained as described above was also added so that the ratio of the total of the primary component, R and M as the additive components, and the auxiliary agent to the Ba—Sr—Ti—Mn—Mg—Si—O crystal oxide was 99.9 to 0.1 on a weight basis. Subsequently, the mixture thus obtained was mixed using a ball mill, thereby forming powdered starting materials for dielectric ceramics according to examples 3-1 to 3-19.

TABLE 7

| | Additive Component (R) | | Additive Component (M) | |
|---|---|---|---|---|
| | Component | Composition Ratio (Molar Ratio) | Component | Composition Ratio (Molar Ratio) |
| Example 3-1 | Dy | 0 | Mn | 1 |
| Example 3-2 | La | 0.01 | Ni | 1 |
| Example 3-3 | Dy | 0.6 | Co | 1 |
| Example 3-4 | Ce | 1.5 | Fe | 1 |
| Example 3-5 | Dy | 1.7 | Mn | 1 |
| Example 3-6 | Dy | 1.0 | Mn | 0 |
| Example 3-7 | Pr | 1.0 | Cr | 0.1 |
| Example 3-8 | Nd | 1.0 | Cu | 0.5 |
| Example 3-9 | Sm | 1.0 | Mg | 1 |
| Example 3-10 | Eu | 0.6 | Al | 1.5 |
| Example 3-11 | Gd | 1.0 | Mo | 2 |
| Example 3-12 | Dy | 0.6 | Mn | 2.5 |
| Example 3-13 | Dy | 1.0 | W | 1 |
| Example 3-14 | Y | 1.0 | V | 1 |
| Example 3-15 | Yb | 1.0 | Mn | 0.5 |
| Example 3-16 | Ho | 1.0 | Mn | 1 |
| Example 3-17 | Er | 1.0 | Mn | 1 |
| Example 3-18 | Tm | 1.0 | Mn | 1 |
| Example 3-19 | Lu | 1.0 | Mn | 1 |

Using the powdered starting materials for the dielectric ceramics according to examples 3-1 to 3-19, in a manner similar to that in experimental example 1, multilayer ceramic capacitors were formed, and in addition to the analyses of the structures and the compositions of the dielectric ceramics forming dielectric ceramic layers of the multilayer ceramic capacitors, various electrical properties were also measured. As for the high temperature load life test, in addition to the test carried out for 1,000 hours as was the case in experimental example 1, a test for 2,000 hours was also performed.

According to the analytical results of the structures and the compositions of the dielectric ceramics of examples 3-1 to 3-19, as the crystal grains, crystal grains composed of $(Ba_{0.98}Ca_{0.02})(Ti_{0.995}Zr_{0.005})O_3$ and crystal grains composed of a Ba—Sr—Ti—Mn—Mg—Si—O crystal oxide were present, and the ratio of the former was 99.8% and that of the latter was 0.2%.

In addition, the following results shown in Table 8 were obtained for the percent of the number of triple points having a cross-sectional area of about 8 $nm^2$ or less.

TABLE 8

| | Triple Points 8 $nm^2$ or less in Area (%) |
|---|---|
| Example 3-1 | 90 |
| Example 3-2 | 90 |
| Example 3-3 | 85 |
| Example 3-4 | 95 |
| Example 3-5 | 90 |
| Example 3-6 | 90 |
| Example 3-7 | 85 |
| Example 3-8 | 90 |
| Example 3-9 | 95 |
| Example 3-10 | 85 |
| Example 3-11 | 95 |
| Example 3-12 | 85 |
| Example 3-13 | 90 |
| Example 3-14 | 90 |
| Example 3-15 | 95 |
| Example 3-16 | 85 |
| Example 3-17 | 95 |
| Example 3-18 | 90 |
| Example 3-19 | 90 |

As can be seen from Table 8, the ratio of triple points having a cross-sectional area of about 8 $nm^2$ or less was abpit 80% or more in examples 3-1 to 3-19.

The results of electrical properties evaluation are shown in Table 9.

TABLE 9

| | Dielectric Constant | Capacitance-Temperature Characteristic (%) | | | | CR Product ($\Omega$F) | Defective Rate | |
|---|---|---|---|---|---|---|---|---|
| | | 20° C. Basis | | 25° C. Basis | | | | |
| | | −25° C. | 85° C. | −55° C. | 85° C. | | 1,000 Hours | 2,000 Hours |
| Example 3-1 | 4,000 | −2.3 | −7.6 | −7.1 | −14.8 | 2,750 | 0/100 | 3/100 |
| Example 3-2 | 4,000 | −1.9 | −7.5 | −6.5 | −14.5 | 2,700 | 0/100 | 0/100 |
| Example 3-3 | 3,800 | −0.9 | −6.5 | −5.4 | −13.7 | 2,700 | 0/100 | 0/100 |
| Example 3-4 | 3,600 | −0.1 | −5.3 | −2.3 | −12.5 | 2,700 | 0/100 | 0/100 |
| Example 3-5 | 2,800 | 0.4 | −3.8 | −2.3 | −10.6 | 2,400 | 0/100 | 0/100 |
| Example 3-6 | 4,100 | −1.6 | −7.4 | −5.2 | −14.1 | 3,300 | 0/100 | 5/100 |
| Example 3-7 | 3,950 | −1.1 | −7.1 | −4.5 | −13.4 | 3,200 | 0/100 | 0/100 |
| Example 3-8 | 3,900 | −0.4 | −6.5 | −4.1 | −13.1 | 2,900 | 0/100 | 0/100 |
| Example 3-9 | 3,700 | −0.1 | −6.2 | −3.5 | −12.4 | 2,700 | 0/100 | 0/100 |
| Example 3-10 | 3,650 | 0.2 | −4.9 | −1.5 | −11.8 | 2,550 | 0/100 | 0/100 |
| Example 3-11 | 3,500 | 1.1 | −4.5 | −1.7 | −11.9 | 2,400 | 0/100 | 0/100 |
| Example 3-12 | 2,900 | 1.5 | −3.4 | −1.5 | −11.1 | 2,250 | 0/100 | 0/100 |

TABLE 9-continued

| | Dielectric Constant | Capacitance-Temperature Characteristic (%) | | | | CR Product ($\Omega$F) | Defective Rate | |
|---|---|---|---|---|---|---|---|---|
| | | 20° C. Basis | | 25° C. Basis | | | | |
| | | −25° C. | 85° C. | −55° C. | 85° C. | | 1,000 Hours | 2,000 Hours |
| Example 3-13 | 3,800 | −1.5 | −6.7 | −4.3 | −12.5 | 2,700 | 0/100 | 0/100 |
| Example 3-14 | 3,700 | −1.2 | −5.3 | −3.8 | −11.9 | 2,700 | 0/100 | 0/100 |
| Example 3-15 | 3,800 | −0.9 | −6.5 | −3.3 | −12.9 | 2,700 | 0/100 | 0/100 |
| Example 3-16 | 3,700 | −0.6 | −6.8 | −2.8 | −13.2 | 2,750 | 0/100 | 0/100 |
| Example 3-17 | 3,750 | −0.4 | −7.2 | −2.4 | −13.8 | 2,700 | 0/100 | 0/100 |
| Example 3-18 | 3,700 | −1.2 | −6.4 | −3.5 | −12.5 | 2,700 | 0/100 | 0/100 |
| Example 3-19 | 3,800 | −1.5 | −6.1 | −3.8 | −11.9 | 2,650 | 0/100 | 0/100 |

From the results shown in Table 9, it was found that superior reliability could be obtained in the high temperature load life test for 1,000 hours in examples 3-1 to 3-19. In addition, the following could be understood from the results of the high temperature load life test for 2,000 hours. In examples 3-2 to 3-5 and 3-7 to 3-19, the amounts of R and M as the additive component in the form of an element were about 0.01 to 1.5 moles and about 0.1 to 2 moles, respectively, with respect to 100 moles of $ABO_3$ used as the primary component as shown in Table 7, and superior reliability could be obtained even in the high temperature load life test for 2,000 hours, as shown in Table 9.

On the other hand, since R as the additive component was not used in example 3-1, and M as the additive component was not used in example 3-6 (Table 7), three defectives in example 3-1 and five defectives in example 3-6 were found in the high temperature load life test for 2,000 hours, as shown in Table 9.

Table 7 shows that with respect to 100 moles of $ABO_3$ used as the primary component, the amount of R was more than about 1.5 moles in the form of an element in example 3-5, and in addition, the amount of M was more than about 2 moles in the form of an element in example 3-12. Hence, as shown in Table 9, the dielectric constant was decreased compared to that of the other samples.

Accordingly, it was understood that R and M were preferably present, and that the contents of R and M in the form of said elements were preferably about 0.01 to 1.5 moles and about 0.1 to 2 moles, respectively, with respect to 100 moles of $ABO_3$ used as the primary component.

As has thus been described, even when the thickness of the dielectric ceramic layers formed from the dielectric ceramic of the present invention is reduced, a multilayer ceramic capacitor having superior reliability can be obtained. Accordingly, when dielectric ceramic layers of a multilayer ceramic capacitor are formed from this dielectric ceramic, a multilayer ceramic capacitor having superior reliability can be obtained, and at the same time, the trend toward miniaturization and higher capacitance of a multilayer ceramic capacitor can be realized by decreasing the thickness of dielectric ceramic layers.

When the content of Ca of the perovskite compound grains is in the range of from about 1 to 20 mole percent of the A element of the perovskite compound represented by $ABO_3$, superior reliability can be obtained in the dielectric ceramic of the present invention, and at the same time, the dielectric constant can also be maintained at a high level.

In addition, when the dielectric ceramic of the present invention further comprises an oxide containing R (where R is at least one selected from the group consisting of La, Ce, Pr, Nd, Sm, Eu, Gd, Tb, Dy, Ho, Er, Tm, Yb, Lu and Y) and M (where M is at least one selected from the group consisting of Mn, Ni, Co, Fe, Cr, Cu, Mg, Al, V, Mo and W), and when the contents of R and M in the form of an element are about 0.01 to 1.5 moles and about 0.1 to 2 moles, respectively, with respect to 100 moles of $ABO_3$, the reliability can be further improved, and at the same time, the dielectric constant can be maintained at a high level.

According to the method of manufacturing of the present invention, the dielectric ceramic of the present invention can be easily and reliably manufactured as described above.

In addition, since the dielectric ceramic of the present invention can be fired in a reducing atmosphere, when a multilayer ceramic capacitor is formed therefrom, a base metal may be advantageously used as a material for the internal electrodes. Furthermore, when the external electrodes are formed by firing simultaneously together with the dielectric ceramic layers, a base metal may be advantageously used as a material for the external electrodes.

What is claimed is:

1. A dielectric ceramic comprising a plurality of crystal grains with triple points located between crystal grains,
   wherein the crystal grains comprise perovskite compound grains composed of a perovskite compound represented by $ABO_3$ (where A is Ba and Ca, and optionally Sr; and B is Ti and optionally at least one of Zr and Hf) and crystal oxide grains composed of a crystal oxide containing at least Ba, Ti and Si, and
   about 80% or more of the number of the triple points have a cross-sectional area of about 8 $nm^2$ or less.

2. The dielectric ceramic according to claim 1, wherein the Ca is about 1 to 20 mole percent of the A element of the $ABO_3$ perovskite compound.

3. The dielectric ceramic according to claim 2, further comprising an oxide containing R and M, where R is at least one selected from the group consisting of La, Ce, Pr, Nd, Sm, Eu, Gd, Tb, Dy, Ho, Er, Tm, Yb, Lu and Y, and M is at least one selected from the group consisting of Mn, Ni, Co, Fe, Cr, Cu, Mg, Al, V, Mo and W,
   wherein the contents of R and M in the form of an element are about 0.01 to 1.5 moles and about 0.1 to 2 moles, respectively, with respect to 100 moles of the $ABO_3$.

4. The dielectric ceramic according to claim 3, wherein the crystal oxide consists of Ba, Ti, Si, O and optionally Ni.

5. The dielectric ceramic according to claim 1, further comprising an oxide containing R and M, where R is at least one selected from the group consisting of La, Ce, Pr, Nd, Sm, Eu, Gd, Tb, Dy, Ho, Er, Tm, Yb, Lu and Y, and M is at least one selected from the group consisting of Mn, Ni, Co, Fe, Cr, Cu, Mg, Al, V, Mo and W, wherein the contents of R and M in the form of an element are about 0.01 to 1.5 moles and about 0.1 to 2 moles, respectively, with respect to 100 moles of the $ABO_3$.

6. The dielectric ceramic according to claim 5, wherein the crystal oxide consists of Ba, Ti, Si, O and optionally Ni.

7. The dielectric ceramic according to claim 1, wherein the crystal oxide consists of Ba, Ti, Si, O and optionally Ni.

8. A method for manufacturing the dielectric ceramic according to claim 1, the method comprising:

providing a mixture of (a) a perovskite compound represented by $ABO_3$ (where A is Ba and Ca, and optionally Sr; and B is Ti and optionally at least one of Zr and Hf); and (b) a crystal oxide containing at least Ba, Ti and Si; and firing the mixture.

9. The method for manufacturing a dielectric ceramic according to claim 8, wherein the mixture further comprises an oxide of R and M, where R is at least one selected from the group consisting of La, Ce, Pr, Nd, Sm, Eu, Gd, Tb, Dy, Ho, Er, Tm, Yb, Lu and Y) and M is at least one selected from the group consisting of Mn, Ni, Co, Fe, Cr, Cu, Mg, Al, V, Mo and W.

10. The method for manufacturing a dielectric ceramic according to claim 9, wherein the mixture further comprises a firing auxiliary agent.

11. The method for manufacturing a dielectric ceramic according to claim 8, wherein the mixture further comprises a firing auxiliary agent.

12. A multilayer ceramic capacitor comprising:

a laminate containing a plurality of dielectric ceramic layers laminated to each other and a plurality of internal electrodes each of which is disposed along a different interface between a pair of dielectric ceramic layers and which are overlapped with each other in a lamination direction; and a pair of external electrodes on external surfaces of the laminate electrically connected to different internal electrodes;

wherein said plurality of dielectric ceramic layers comprises the dielectric ceramic according to claim 1.

13. The multilayer ceramic capacitor according to claim 12, wherein the internal electrodes comprise a base metal.

14. The multilayer ceramic capacitor according to claim 13, wherein the external electrodes comprise a base metal.

15. A multilayer ceramic capacitor comprising:

a laminate containing a plurality of dielectric ceramic layers laminated to each other and a plurality of internal electrodes each of which is disposed along a different interface between a pair of dielectric ceramic layers and which are overlapped with each other in a lamination direction; and a pair of external electrodes on external surfaces of the laminate electrically connected to different internal electrodes;

wherein said plurality of dielectric ceramic layers comprises the dielectric ceramic according to claim 2.

16. The multilayer ceramic capacitor according to claim 15, wherein the internal electrodes comprise a base metal.

17. The multilayer ceramic capacitor according to claim 16, wherein the external electrodes comprise a base metal.

18. A multilayer ceramic capacitor comprising:

a laminate containing a plurality of dielectric ceramic layers laminated to each other and a plurality of internal electrodes each of which is disposed along a different interface between a pair of dielectric ceramic layers and which are overlapped with each other in a lamination direction; and a pair of external electrodes on external surfaces of the laminate electrically connected to different internal electrodes;

wherein said plurality of dielectric ceramic layers comprises the dielectric ceramic according to claim 3.

19. The multilayer ceramic capacitor according to claim 18, wherein the internal electrodes comprise a base metal.

20. The multilayer ceramic capacitor according to claim 19, wherein the external electrodes comprise a base metal.

* * * * *